United States Patent Office 3,349,840
Patented Oct. 31, 1967

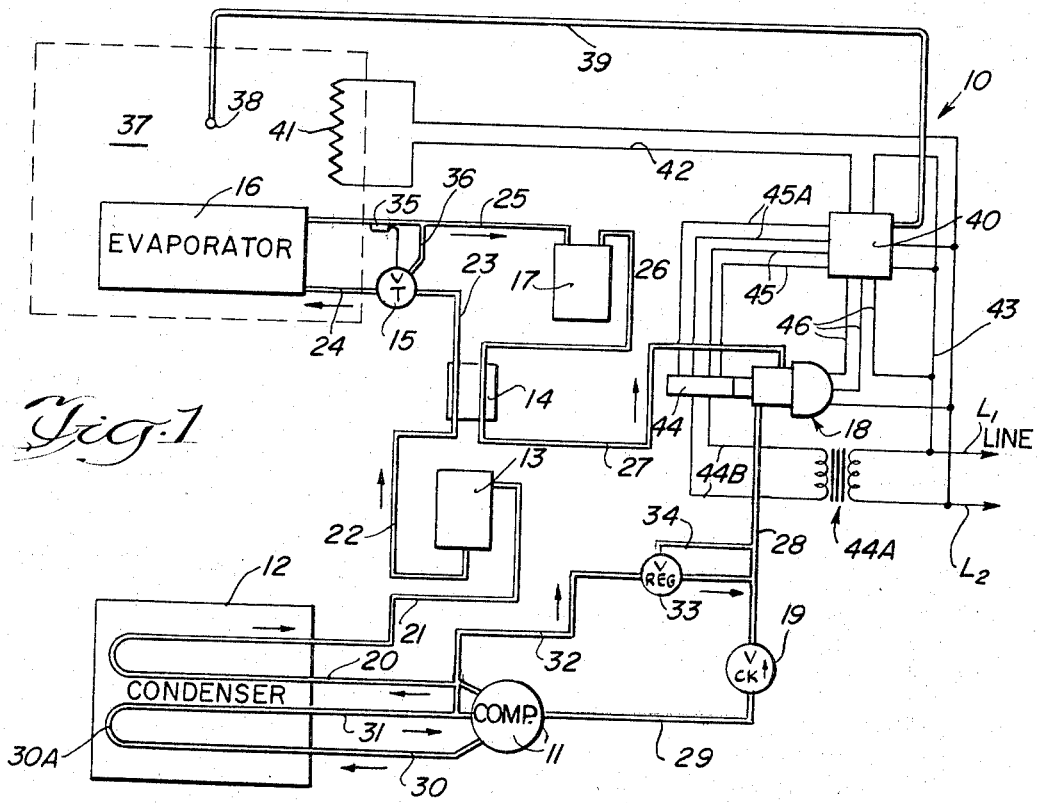
Fig. 1
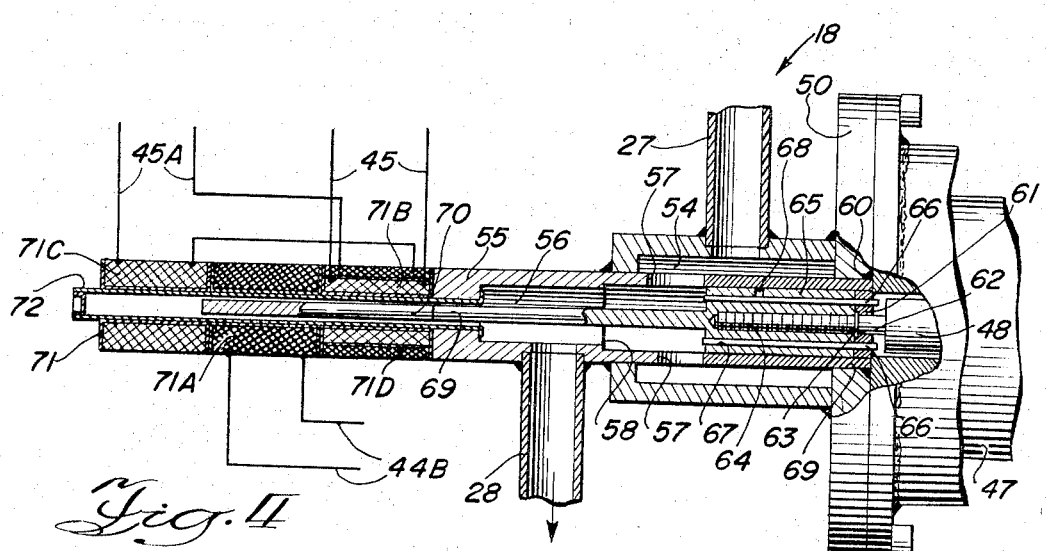
Fig. II
Inventors
Paul H. Tope
Alexander L. Reiter

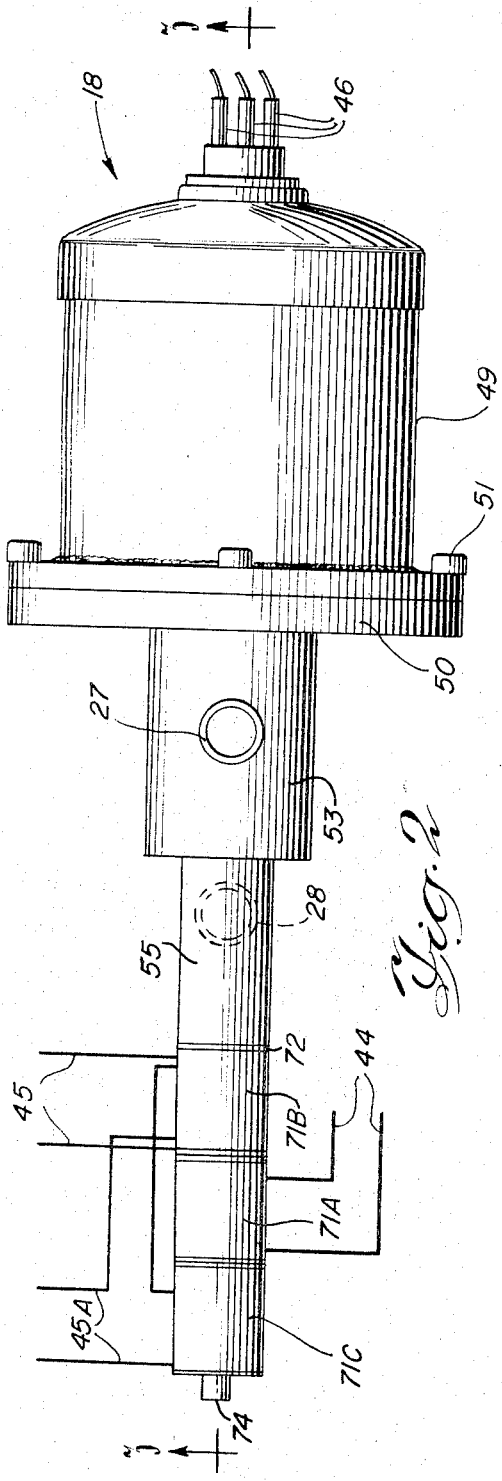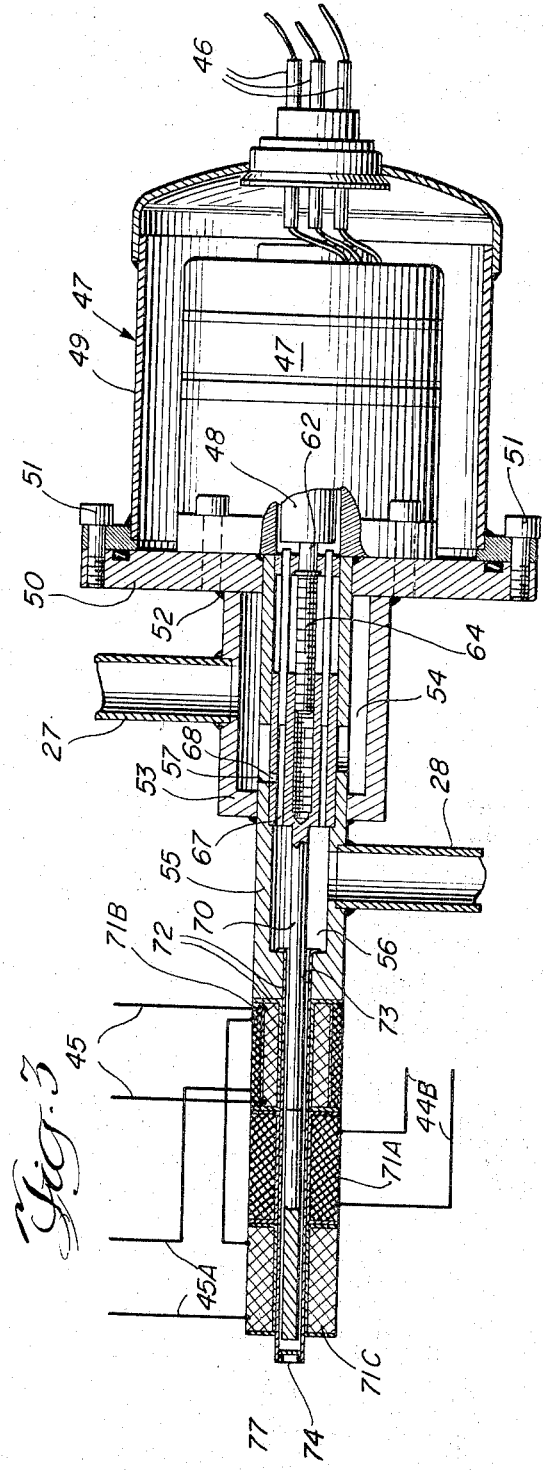

3,349,840
FLUID FLOW CONTROL APPARATUS
Paul H. Tope and Alexander L. Reiter, St. Joseph, Mich., assignors to Whirlpool Corporation, a corporation of Delaware
Filed Apr. 5, 1965, Ser. No. 445,568
9 Claims. (Cl. 165—26)

ABSTRACT OF THE DISCLOSURE

A temperature control system for a storage container having heating apparatus and cooling apparatus including a fluid modulating valve whereby the modulating valve controls fluid flow through the cooling apparatus to cool the container as needed and cooperates with the control system to energize the heating means as needed to maintain a predetermined temperature within the container.

---

This invention relates to apparatus for controlling the temperature of a space, and in particular to apparatus for automatically regulating refrigerant flow in a refrigeration system and heat output of a heating system.

In one form of conventional refrigeration systems, a compressor provides refrigerant fluid through a condenser to an evaporator wherein refrigeration is effected as a result of the evaporation of the refrigerant fluid therein. The evaporator fluid is then returned to the compressor through an evaporator pressure regulator valve which maintains a constant back-pressure on the evaporator to effectively maintain a constant predetermined temperature of the evaporator. The evaporator pressure regulator is set to maintain the evaporator at a temperature which will meet the normal cooling requirements of a space to be cooled. This is accomplished by an "on-off" control of the refrigeration compressor or flow of the refrigerant fluid therefrom. To obtain an evaporator temperature lower than the predetermined temperature, such as to meet abnormal cooling requirements, the evaporator pressure regulator is bypassed. This bypass action causes a rapid decrease in evaporator temperature below the temperature maintained by the pressure regulator, as well as a rapid dehydration of the atmosphere in the space. Further, the above described conventional refrigeration system operates to allow the temperature to vary over a range which when averaged results in a temperature near the desired. Thus, the above described refrigeration system is unable to maintain a substantially constant preselected temperature in the space.

The present invention comprehends an improved apparatus for regulating the capacity of a refrigeration system and the heat output of the heating system as a function of the temperature requirements of a space to be controlled, to maintain a substantially constant, or "straight line," temperature control within the space. Thus, a principal feature of the present invention is the provision of a new and improved apparatus for controlling the temperature of a space.

Another feature of the invention is the provision of such apparatus for controlling the temperature of a space including a valve means in a refrigeration system and means for controlling the valve means for selectively initiating and regulating the cooling of said space.

Yet another feature of the invention is the provision of such an apparatus for controlling the temperature of a space wherein the valve means further includes means for selectively initiating and regulating the heating of said space.

A further feature of the invention is the provision of such an apparatus for controlling the temperature of a space including a valve having a flow passage and movable means for regulating refrigerant flow through said passage, means providing a reference signal, drive means for positioning the movable means, and means responsive to the position of the movable means and to the reference signal for selectively operating the drive means.

Still another feature of the invention is the provision of such an apparatus for controlling the temperature of a space wherein the drive means comprises a motor device.

A yet further feature of the invention is the provision of such an apparatus for controlling the temperature of a space wherein the drive means includes a rotary motor device and means for converting the rotary motion of the motor device to a linear motion.

A yet further feature of the invention is the provision of such an apparatus for controlling the tempertaure of a space wherein the position responsive means includes a transducer having a portion operatively connected to the movable means for travel therewith.

A further feature of the invention is the provision of such an apparatus for controlling the temperature of a space wherein the transducer comprises a variable transformer.

Another feature of the invention is the provision of such an apparatus for controlling the temperature of a space having means for providing a continuous small flow through the valve at all times.

Yet another feature of the invention is the provision of such an apparatus for controlling the temperature of a space wherein the valve is installed between the evaporator and the suction inlet of a compressor in a refrigeration system.

A further feature of the invention is the provision of such an apparatus for controlling the temperature of a space wherein the means providing a reference signal comprises means for sensing a preselected temperature of a space refrigerated by the evaporator and heated by the heating system.

Other features and advantages of the invention will be apparent from the following description taken in connection with the accompanying drawing wherein:

FIGURE 1 is a schematic diagram illustrating the fluid flow and electrical circuitry of a refrigeration system provided with apparatus embodying the invention for controlling the temperature of a space;

FIGURE 2 is a side elevation of the apparatus for controlling fluid flow and heat output;

FIGURE 3 is a diametric section thereof taken substantially along the line 3—3 of FIGURE 2 and with the valve in the maximum closed position; and FIGURE 4 is a diametric section generally similar to that of FIGURE 3 but with the valve in the maximum open position.

In the exemplary embodiment of the invention as disclosed in the drawing, a refrigeration system generally designated 10 (FIGURE 1) is shown to comprise a conventional motor operated compressor 11, a condenser 12, a fluid receiver 13, a heat exchanger 14, and expansion valve 15, an evaporator 16, an accumulator 17, a fluid flow controller 18, and a check valve 19 connected in a series loop for cycling refrigerant fluid through the apparatus. As shown in FIGURE 1, the refrigerant fluid is directed to precooler coil 30A in condenser 12 through conduit 30. The precooled refrigerant fluid is returned to compressor 11 through conduit 31 to cool the compressor motor (not shown) in a conventional manner. The refrigerant fluid is then directed from compressor 11 through condiut 20 to condenser 12, from the condenser 12 through a conduit 21 to the receiver 13, from the receiver 13 through a conduit 22 to the heat exchanger 14, from the heat exchanger 14 to the expansion valve 15 through a conduit 23, from the expansion valve 15 through a conduit 24 to the evaporator 16, from the evaporator 16 through a conduit 25 to the accumulator 17, from the accumulator 17 through a conduit 26 back to the heat exchanger 14, from the heat exchanger 14 through a conduit 27 to the fluid flow controller 18, from the fluid flow controller 18 through a conduit 28 to check valve 19, and from the check valve 19 through a suction conduit 29 back to the compressor 11. Further, a conduit 32 is connected to the conduit 31 to bypass a portion of the refrigerant fluid through a pressure regulating valve 33 back to the conduit 28, check valve 19, and suction conduit 29 to preclude damage to compressor 11, such as abnormally low suction pressure, which can occur when fluid flow controller 18 closes sufficiently. As shown in FIGURE 1, an equalizing conduit 34 is connected from conduit 28 to the pressure regulating valve 33.

Expansion valve 15 is temperature responsive, being controlled by a thermostatic bulb 35 arranged to sense the temperature of the outlet conduit 25 leaving evaporator 16. Pressure equalization is effected by means of an equalizer conduit 36 extending between valve 15 and the conduit 25.

The evaporator 16 as shown herein is disposed within a chamber, or space, 37, the temperature of which is to be controlled. The temperature of chamber 37 is sensed by a temperature responsive device 38 which is connected by means of electrical wires 39 to a controller 40. The thermoresponsive device 38 may comprise any suitable device for delivering an electrical signal to the controller 40 as a function of the temperature within chamber 37 and herein comprises a thermistor. Also disposed within the chamber 37 is an electrical heater 41 which is connected by electrical wires 42 and 43 to the controller 40 and power supply leads $L_1$ and $L_2$. Controller 40 receives electrical energy through wires 43 from a suitable power supply comprising power supply leads $L_1$ and $L_2$. The power supply leads $L_1$ and $L_2$ are further connected to a transducer 44 associated with fluid flow control 18, through a transformer 44A. The transducer 44 produces a signal which is delivered through two sets of wires 45 and 45A to the controller 40 wherein a preset electrical circuit within controller 40 compares the signal from the transducer 44 with the signal from the thermoresponsive device 38. The electrical circuit in the controller 40 is preset to correspond to a preselected temperature which is desired in chamber 37 and operates to produce a resultant output signal which is delivered though wires 46 to the fluid flow controller 18. The resultant output signal will effect either the cooling or heating of chamber 37 by energizing fluid flow controller 18.

Referring now more specifically to FIGURES 2 through 4, the fluid flow control 18 comprises a motor 47 herein comprising a conventional rotary electric motor having a rotor 48. The motor includes a housing 49 fixedly secured to a base plate 50 as by suitable screws 51. Secured to base plate 50 as by weld 52 is a valve housing 53. Within the valve housing 53 is a flow passage 54 which is in communication with conduit 27 delivering refrigerant fluid thereto from the heat exchanger 14. A cylindrical member 55 extends coaxially into passage 54 and includes a secondary flow passage 56 which is in communication with the flow passage 54 through openings 57 therein. The flow passage 56, as best seen in FIGURE 4, is provided with an annular shoulder 58 intermediate its ends. The cylindrical member 55 extends through an opening 59 in the base plate 50 and is secured thereto by suitable means such as weld 60. The right-hand end of the passage 56, as best seen in FIGURE 4, is sealingly closed by a plug 61. A shaft 62 extends coaxially outwardly from the motor rotor 48 and is provided with an annular collar 63. Outwardly from the collar 63, the shaft 62 defines a threaded portion 64 which is threaded into a cylindrical valve member 65 slidably received in the flow passage 56 between annular shoulder 58 and plug 61. The valve member 65 is precluded from rotating by means of a plurality of rods 66 fixedly secured to the plug 61 and slidably received in corresponding bores 67 extending parallel to the axis of the valve member. Bores 67 also provide a passage from flow passage 56 to the chamber adjacent plug 61 to equalize the pressure on each side of valve member 65.

The valve member 65 can be further provided with a bypass port such as port 68 which communicates with bore 67 and opening 57 when the valve is located in its substantially closed position (FIGURE 3). The left-hand end of the flow passage 56 is in communication with the conduit 28, as shown in FIGURE 4, and, thus, in the substantially closed position of the valve, fluid flow may occur from conduit 27 through flow passage 54, opening 57, port 68, bore 67, and flow passage 56 to conduit 28. The bypass port 68 then provides some compressor protection against a dangerously low suction pressure. When the valve is in the open position as shown in FIGURE 4, fluid flow may be had from conduit 27 through flow passage 54, opening 57, and flow passage 56 to conduit 28. The movement of the valve member 65 is effected by the rotation of the motor shaft 48. This results in the turning of the threaded portion 64 of shaft extension 62 with respect to the valve member 65. Since valve member 65 is retained against rotation, linear movement of the valve member coaxially of the flow passage 56 is achieved in a direction controlled by the direction of rotation of the motor.

Extending outwardly from the valve member 65 is a cylindrical extension 69 carrying at its outer end a magnetic core 70. The cylindrical member 55 is preferably formed of a nonmagnetic material such as brass. Annular transformer 71 is mounted on the outer end of the cylindrical member 55 to have an inductive coupling between the primary coil 71A having leads 44B and the secondary coils 71B and 71C, the inductive coupling varying as a function of the position of core 70 coaxially within the transformer. Secondary coil 71C has a portion 71D which is positioned and wound to oppose the voltage induced in coil 71C to maintain the secondary of the transformer 71 in the linear portion of its voltage output characteristic. Thus, the secondary or output voltage of the transformer as delivered therefrom through wires 45 and 45A is substantially a direct linear function of the primary voltage impressed on the transformer by supply leads 44B and the variable coupling effected by the variable positioning of core 70. As core 70 is directly movable with the valve member 65, the output voltage delivered through wires 45 and 45A to the controller 40 is directly linearly related to the position of the valve in flow passage 56 and, thus, to the rate of flow permitted by the fluid flow controller 18 and the rate of heat output by heater 41.

The core 70, as shown in FIGURE 3, is movable in a tubular housing 72 fixed in a small diameter outer bore 73 extending outwardly from flow passage 56. The housing 72 as well as the cylindrical member 55 are preferably formed of antimagnetic material, such as aluminum or brass. The outer end of the housing 72 is closed by a suitable cap 74 to cloes the end of the housing. The entire fluid flow controller 18 is hermetically sealed for improved trouble-free functioning.

In illustrating the operation of the refrigeration system as controlled by the fluid flow controller 18, it will be assumed that the temperature in the chamber 37 is originally substantially higher than that set in the controller 40. Thus, the electric signal produced by temperature responsive device 38 and transducer 44 when compared with the preset circuit in the controller 40 provides an electrical output to the motor 47 of the fluid flow control 18 tending to move the valve member 65 to the right as shown in FIGURE 4, thereby opening the valve by uncovering the inlet openings 57. Thus, free flow is provided through the valve from conduit 27 to conduit 28 thereby permitting maximum refrigeration in the system. As the temperature of chamber 37 decreases to the point where the electric signal provided by thermoresponsive device 38 and transducer 44 approximates the set circuit in controller 40, the motor 47 is intermittently energized in the reverse direction to move the valve member 65 leftwardly, as seen in FIGURE 4, and progressively close the openings 57 thereby throttling, or modulating, the flow through the refrigeration system. When the electric signal provided by thermoresponsive means 38 and transducer 44 balances the preset circuit, the valve member 65 is positioned so that the refrigerant flow through controller 18 or the heat output of heater 41 matches the heat load (B.t.u./hr.) requirement of chamber 37. When the temperature in chamber 37 again increases, the cooling process will be repeated.

In the event that the temperature within chamber 37 drops below the temperature at which the electric signal from the thermoresponsive device 38 and the transducer 44 balances the preset circuit of controller 40, the controller 40 will effect the energization of motor 47 to move valve member 65 further to the left, as viewed in FIGURE 3, to either reduce the refrigerant through controller 18 or to effect the energization and modulation of heater 41 through the inductive coupling between the primary winding 71A and the secondary winding 71B. As the temperature of chamber 37 increases to the preset temperature, motor 47 is intermittently energized in the reverse direction to move the valve member 65 to the right, as seen in either FIGURES 3 and 4, to progressively modulate the heat output or refrigerant flow to match the heat load (B.t.u./hr.) requirement of chamber 37. In the event the temperature in compartment 37 again decreases to below the preset temperature, the above described heating process is repeated.

Thus, whenever the temperature in chamber 37 rises above the preset temperature, the controller 40 causes an increase in the cooling of chamber 37. As the temperature is brought back to the desired temperature, the controller 40 causes the controller 18 to modulate either the heat output or the refrigerant flow so that the load (B.t.u./hr.) requirements of chamber 37 are met. At the preselected temperature, the small flow of refrigerant through port 68 provides a small amount of refrigeration to the chamber 37 offsetting the heat load thereof. Should this small amount of refrigeration, however, be sufficient to more than offset the heat load in chamber 37, the temperature of the chamber will drop to below the preselected temperature. When the temperature of the chamber drops appreciably below the preset temperature, such as where the outside temperature is appreciably below the preset temperature, the controller 40 causes a heat output in the chamber 37. As the temperature is brought back to the desired temperature, the controller 40 causes the fluid flow controller 18 to modulate either the heat output or the refrigerant flow so that the load (B.t.u./hr.) requirements of chamber 37 are met. Thus, the temperature in the chamber 37 may be accurately maintained at a substantially constant preselected temperature, such as 33° F. Such control is highly desirable, for example, where the chamber 37 comprises a refrigerator chamber such as for storing foodstuffs where it is desirable to refrigerate certain foodstuffs, such as milk, vegetables, etc., to a sufficiently low temperature but at a temperature that will prevent damage thereof.

While we have shown and described one embodiment of our invention, it is to be understood that it is capable of many modifications. Changes, therefore, in the construction and arrangement may be made without departing from the spirit and scope of the invention as defined in the appended claims. The embodiment of the invention in which an exclusive property or privilege is claimed is defined as follows:

1. Apparatus for maintaining a chamber at a preselected temperature, comprising: an evaporator in heat transfer association with said chamber; means for circulating refrigerant fluid to said evaporator for effecting refrigeration thereof; valve means for varying the rate of flow of refrigerant fluid through said circulating means for controlling said refrigeration; means for providing heat to said chamber; and means for selectively controlling said valve means and said heat means for maintaining a preselected temperature of said chamber, said controlling means concurrently inversely proportionately varying the rate of flow of refrigerant and the rate of heat provided by said heat means when the temperature in said chamber is in a relatively high range, and causing said rate of flow of refrigerant to remain at a constant low value while varying the heat provided by said heat means when said temperature is in a range below said high range.

2. The apparatus of claim 1 wherein said controlling means includes means for modulating each of said valve means and said heat means to reduce the effect thereof as the temperature of said chamber approaches said preselected temperature.

3. The apparatus of claim 1 wherein said controlling means comprises a variable transformer and said second portion of the secondary winding coacts with said first secondary winding to effectively maintain the transformer in the linear portion of its output voltage characteristics.

4. The apparatus of claim 1 wherein said controlling means comprises a variable transformer carried by the refrigerant fluid valve means and said secondary windings effectively maintain the output voltage substantially unaffected by temperature conditions of the transformer.

5. The apparatus of claim 1 wherein said controlling means comprises a variable transformer and said secondary windings effectively maintain the output voltage substantially unaffected by variations in the primary voltage.

6. Apparatus for maintaining means capable of having a variable temperature at a preselected temperature, comprising: refrigeration means for circulating a refrigerant fluid in heat transfer with said variable temperature means; means for providing a first signal corresponding to the temperature of said variable temperature means; valve means positioned in said refrigeration means including a valve member for modulating the flow of refrigerant fluid through said refrigeration means; drive means operatively connected to said valve member for adjustably positioning said valve member; means for providing a second signal corresponding to the position of said valve member; control means responsive to said signals for controlling the operation of said drive means to cause a change in refrigerant fluid flow through said valve means to maintain said preselected temperature, said second signal means comprising a transducer including a coil portion connected to said valve means and a core portion operatively connected to said valve member, said coil portion including a primary winding, a first secondary winding adjacent one end of said primary winding, and a second secondary winding having a first portion adjacent the other end of said primary winding and a second portion adjacent the first mentioned end of said primary winding in electrical opposition to said first portion; electrical heating means in heat transfer association with said variable temperature means; and means connecting said heating means to said secondary windings of said transducer to provide modulated heating of said variable temperature means as a function of the disposition of said core portion of the transducer.

7. Apparatus comprising: a valve having a body, means defining a flow passage through said body, and a movable valve member in said body for adjustably varying said flow passage between a preselected maximum opening and a preselected small opening; and a transformer having windings carried by said valve body and a core integral with said movable valve member for varying the output voltage of the transformer in accordance with the disposition of the valve member.

8. Apparatus comprising: a valve having a body, means defining a flow passage through said body, and a movable valve member in said body for adjustably varying said flow passage between a preselected maximum opening and preselected small opening; and a transformer having windings carried by said valve body and a core carried by said movable valve member for varying the output voltage of the transformer in accordance with the disposition of the valve member, said core being disposed within said valve body.

9. Apparatus comprising: a valve having a body, means defining a flow passage through said body, and a movable valve member in said body for adjustably varying said flow passage between a preselected maximum opening and a preselected small opening; and a transformer having windings carried by said valve body and a core carried by said movable valve member for varying the output voltage of the transformer in accordance with the disposition of the valve member, said valve member having a range of movement while maintaining said flow passage at said preselected small opening and said core being arranged to vary the voltage output as a function of the movement of said valve member in said range.

References Cited

UNITED STATES PATENTS

| | | | |
|---|---|---|---|
| 1,767,958 | 6/1930 | Berg | 251—267 X |
| 2,420,539 | 5/1947 | Hornfeck | 340—178 |
| 2,473,494 | 6/1949 | Wannamaker | 236—78 X |
| 2,661,907 | 12/1953 | Wissmiller | 236—78 X |
| 2,842,345 | 7/1958 | Brown | 165—26 |
| 3,003,331 | 10/1961 | Coburn et al. | 62—217 X |
| 3,112,791 | 12/1963 | Brahm | 165—28 |
| 3,128,946 | 4/1964 | Hoberman | 236—78 |
| 3,165,681 | 1/1965 | Pinckaers | 236—78 X |
| 3,204,423 | 9/1965 | Resh | 62—209 |
| 3,250,084 | 5/1966 | Anderson | 62—210 X |

FOREIGN PATENTS

| | | |
|---|---|---|
| 411,370 | 6/1934 | Great Britain. |
| 905,091 | 9/1962 | Great Britain. |

ROBERT A. O'LEARY, *Primary Examiner.*

A. W. DAVIS, *Assistant Examiner.*